Nov. 10, 1953   R. E. STEVENS ET AL   2,658,820
APPARATUS FOR CARRYING OUT SPOT TEST ANALYSES
Filed March 1, 1950
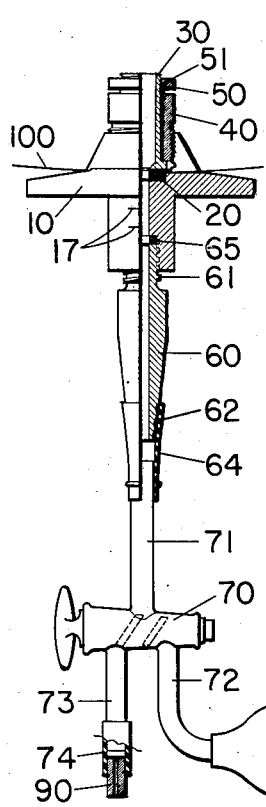
FIG. 6
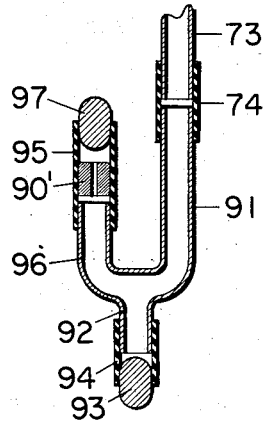
FIG. 5
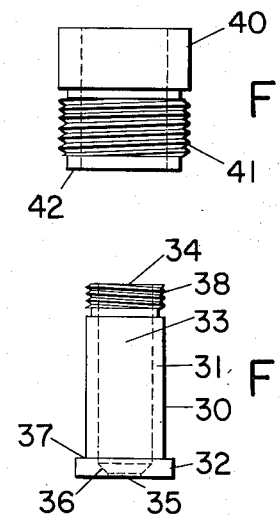
FIG. 3
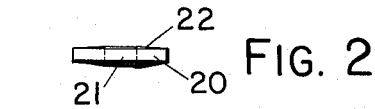
FIG. 4
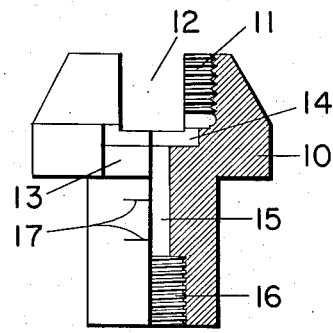
FIG. 2
FIG. 1
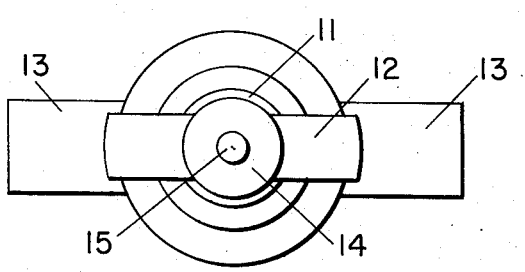
FIG. 1a
ROLLIN E. STEVENS
HUBERT W. LAKIN
JOSEPH F. MULLINS
INVENTORS
BY Roy C. Hackley, Jr.
ATTORNEY

Patented Nov. 10, 1953

2,658,820

UNITED STATES PATENT OFFICE 2,658,820

APPARATUS FOR CARRYING OUT SPOT TEST ANALYSES

Rollin E. Stevens, Vienna, Va., Hubert W. Lakin, Silver Spring, Md., and Joseph F. Mullins, Washington, D. C.

Application March 1, 1950, Serial No. 147,114

1 Claim. (Cl. 23—253)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to a method and apparatus for carrying out spot test analyses.

The use of spot tests for detecting ions in solution has long been known as a technique capable of high sensitivity and specificity. This spot test technique consists essentially of bringing the reagent and test solution together on paper or other porous medium. The reaction products, concentrated in a small area at the contact of the reagent and test solution, are easily detected, and the excess liquid flows away in the surrounding fibers. Papers previously coated or impregnated with the reagents have also been extensively used in the past for such purposes.

These spot test techniques serve well the needs for qualitative testing as they are highly sensitive, specific, and easy to perform. Their application to determining the quantity of an ion present, however, is limited by the fact that the reaction products form in an area of indefinite extent and are not reproduced by successive tests.

Accordingly, it is an object of this invention to provide a method and apparatus for adapting spot test techniques to permit quantitative analyses. Other objects and advantages of this invention will be apparent or will appear hereinafter.

In the technique for making spot test analyses involving contacting a permeable indicator with a solution under test, these objects and advantages are accomplished by the steps which comprise confining a uniform cross sectional area of said indicator, contacting said confined area with a known volume of the test solution, and subjecting said solution to a constant pressure whereby the time of contact between the test solution and indicator will be substantially constant in successive runs using the same volume of solution, thereby making possible quantitative estimations of the concentration of the substance for which said indicator is indicative.

These objects and advantages are also accomplished by the apparatus for spot testing which comprises means for confining a uniform cross sectional area of a permeable indicator, means for confining a volume of solution in contact with said uniform area of indicator, and means for controlling the rate of flow of said solution through said confined area.

The invention in a preferred form is illustrated in the drawings and hereinafter more fully described.

Figure 1 is a partly sectionalized end view of the filter body section. Figure 1a is a top view of the filter body section. Figure 2, 3 and 4 are vertical cross sections of a front view of the washer, funnel insert, and pressure applying flange respectively. Figure 5 is a modified capillary tip construction. Figure 6 is a front view, partly sectionalized, of the complete apparatus assembly.

Referring now to the figures, particularly to Figure 6, there is shown a presently preferred embodiment of the invention which is useful when the permeable indicator is in strip form. In this embodiment, the confining of a uniform cross sectional area is accomplished by the filter assembly which includes the filter base body 10, the beveled washer 20, the funnel insert 30, the pressure flange 40, and funnel cap 50; each of these elements will hereinafter be described in greater detail. The assembly of means for subjecting the confined area of the indicator to constant pressure and controlling the rate of flow include an adapter 60, a three-way stop cock 70, a level adjusting means 80, a capillary tip 90, and various connectors, plugs and the like to complete the assembly which will be described in greater detail hereinafter.

Still referring to the preferred embodiment as shown in the figures, particularly Figures 1 and 1a, the filter base body 10 can be constructed in various ways; however exceptionally satisfactory results have been obtained where this element is constructed as shown in Figures 1 and 1a, where the body is shown as being tapped and threaded 11 to receive the pressure applying flange 40 as will be hereinafter described. Passing through said tap hole is the reagent strip slot 12. Aligned with said slot 12 and extending outwardly from the body section are arm 13 upon which the reagent strip can rest. These arms are useful to permit marking on the reagent strip in addition to supporting said strip. At the base of the tap hole 11 is a recessed washer seat 14. The drain tube or outlet 15 is drilled through rest of the body section from the base of the washer seat and is aligned with the opening 21 of the washer 20. The bottom of the outlet is tapped and threaded 16 to receive the adapter 60. It has been found convenient to fabricate the body section from transparent plastics, however, other materials can be used. When transparent materials are employed in this portion, it is convenient to inscribe or otherwise mark the portion of the body surrounding the outlet 15 with timing marks 17, the function of which will be described more completely hereinafter. A gasket, 65, may be used to produce a tight connection between the filter base body 10 and adaptor 60.

The adaptor 60 is merely a threaded 61 tubular reducing connection having a multi-filleted end 62 to permit the use of rubber or other flexible tubing to connect the filter and the pressure applying means. The adaptor 60 is connected to one arm 71 of a three-way stop cock 70 by means of tubing connector 64. While in the particular embodiment shown in Figure 5 is a "fork-type" stop cock, T, Y and similar three-way arrangements can also be employed. Another arm 72 of stop cock 70 is connected to level controlling means 80, such as a syringe bulb, leveling jar, and the like. The last, or outlet, arm 73 of stop cock 70 is connected by suitable tubing a connector 74 to a capillary tip 90.

Figure 5 shows a possible modification of the capillary tip which prevents clogging of the capillary by sediment. In Figure 5 there is shown a three-way "fork-type" connection, one arm 91 is connected through tubing connector 74' to arm 73 of the stop cock 70. Sediment collects in arm 92 and may be flushed out by removing plug 93 from connector 94. The capillary 90' is inside a rubber or other flexible connecting sleeve 95 which is attached to arm 96 and sealed by plug 97.

Referring now to Figures 2, 3, and 4, the funnel insert has a cylindrical body section 31 and a flanged base 32. While the flanged base as shown in this particular embodiment is circular, other shaped flanges can also be employed which will conform in shape to the recessed portion of the filter body base adapted to receive it. By this it is possible to prevent the rotation of the insert when applying pressure by means of the pressure flange as will be described hereinafter and therefore will prevent applying undue torsional stresses to the reagent strip. For example, the flanged base could be square or any other desired shape. Further it could have protrusions or recesses which would conform to corresponding recesses and protrusions in the filter base body. The upper portion 38 of the funnel insert may be threaded to receive the funnel insert cap 50. The body section 31 is chambered 33 and has opening therein serving as the inlets 34 and the outlet 35. The opening in the outlet 35 is to be coaxially aligned and congruent (identical in shape and cross sectional area) with the corresponding opening 21 of the beveled 22 washer 20 which is seated in the washer seat 14 of body section 10. In the specific embodiment shown in Figures 1 to 6 the chamber 33 is larger in cross section, therefore, a tapered or funnel seat 36 is provided to facilitate fluid flow through the opening 35 and the upper portion is threaded 38 to receive the funnel cap 50, which serves to join funnel insert 30 to pressure flange 40.

The pressure applying flange 40 shown in the drawings is so constructed that it will slip over and rotate around the body section 31 of the funnel insert. The lower portion of the pressure flange is threaded 41 to engage with the threaded portion 11 of the filter base body. The base of the pressure flange 42 contacts and operates against the upper portion 37 of the funnel insert flange.

Referring now to Figure 6, there is shown the reagent strip 100 in the completely assembled apparatus. The apparatus can be readily modified to adapt it to other forms of permeable or porous reagent media such as discs, sheets, and the like. The treatment of papers and similar porous media for use with this apparatus do not form part of this invention however such treatment and the types of determinations for which this apparatus is useful are described in Stevens, Rollin E., and Lakin, Hubert W., The chromograph, a new analytical tool for laboratory and field use: U. S. Geological Survey Circular 63, 1949.

The assembled apparatus, hereinafter sometimes referred to as the "chromograph," can be made of various material, however, the inventors have found "Lucite" plastic to be especially suitable. Various portions of the apparatus can obviously be fashioned in single piece construction or otherwise combined without departing from the scope of this invention. For example, the lower assembly pieces 10, 60, 70 and 90 readily lend themselves to various combinations by eliminating the connecting means and fabricating the elements as a single unit.

In order to make results with this "chromograph" comparable, certain dimensions have been tentatively adopted. The bottom opening of the funnel insert 30 and the hole in the beveled washer 20 were made ¼" in diameter, thus producing a confined spot of that size. The drain tube 15 through the filter base body 10 was also made ¼" in diameter and for purposes of timing and adjusting, the marks 17 were placed ¼" apart on the outside of the filter base body as shown in Figure 1, the upper mark being ½" below the top of the beveled washer 20 when it is seated in the washer seat 14. The drain tubes leading to the capillary tip were sufficiently large to allow free flow of liquid. The outlet of the capillary tip 90 was placed 9" below the upper timing mark 17.

To assemble the apparatus the filter base adapter 60 is screwed into the filter base body 10 to make a liquid tight connection as shown in Figure 6. Insert the beveled washer 20 in the washer seat 14 of the filter base body with the beveled edge up. Assemble the funnel head by inserting the funnel insert 30 (with the threaded section 38 up) into the pressure flange 40 (the threaded section 41 down) and screw the funnel inset cap 50 tightly in place. The parts of the funnel head are constructed with sufficient clearance so that the funnel insert turns freely in the pressure flange when the filter head is assembled. Next screw the filter head into the top of the filter base body 10. Connect the three-way stop cock 70 to the filter base adapter 60 and the standard capiliary tip 90 to the outlet tube 73 with suitable tubing connectors 64 and 74. Connect the leveling means 80 to the stop cock arm 72 as shown in Figure 5.

The time of drainage tentatively adopted was 200, plus or minus 10 seconds, for a column of solution to fall from the upper timing mark to the lower mark starting with a 9" head of solution, and without paper in the reagent paper slot. In order to attain this it is necessary to select or adjust the capillary. A 2" capillary having 0.15 mm. internal diameter was found to meet the drainage time requirement. However, capillaries of greater bore can be used by drawing the tube out in a flame and pinching the tapered end until proper drainage time has been attained. Capillaries having smaller bores can be used by shortening the length of the capillary to give the proper rate of flow.

In operation the outlet tube 73 connector 74 capillary tip 90 and leveling bulb 80 are filled with water or with solution from previous tests. Stop cock 70 is then operated to connect arms 72 and 71 and the liquid level is raised to the upper timing mark by means of the leveling bulb 80. Stop cock 70 is then placed in a closed position. The pressure flange 40 is then loosened permitting the funnel insert 30 to be lifted from the beveled washer 20 and a strip of reagent paper is then placed through slot 12 so that a portion of the strip is directly over the drain tube 15. The pressure flange 40 is then tightened, thereby urging the funel insert 30 into close contact with the paper 100 which is resting on the beveled washer 20. This tightening of the pressure flange results in confining an area of the reagent strip 100 equal to the diameter of the openings in the funnel insert 30 and beveled washer 20. A given volume of test solution is then introduced by any suitable means into the chambered portion 33 of the funnel insert 30 and stop cock 70 is immediately rotated to connect arms 71 and 73. When the test solution has drained through the confined spot on the reagent strip 100 stop cock 70 is operated to again connect arms 72 and 71, pressure flange 40 is turned to raise funnel insert 30, the liquid seal between the reagent strip 100 and the beveled washer 20 broken, and liquid and used test solution drawn through arms 72 and 71 into leveling bulb 80. These operations may be repeated for the next test on an unused portion of reagent strip 100.

The "chromograph" was designed to control the speed of flow and to confine new areas of a reagent strip for successive tests quickly and easily, particularly when using small volumes of test solutions. The device confines areas of a definite size on a strip of reagent paper forwarded through the apparatus and automatically controls the rate of flow of the test solution through the confined spot. As each spot test is completed, the sample number, location or other distinguishing data may be written on the paper and the paper pulled through the apparatus to bring into position for the next test a spot on an unused portion of the reagent paper. The strips of paper containing the spots serve as semipermanent records of tests performed. The rate of flow of test solution through the confined spot is automatically controlled by the pull of a column of water and/or the filtrate from previous tests, together with the capillary tip to retard the rate of flow. The capillary tip makes the rate of flow essentially independent of the porosity of the filter paper and the quantity of precipitate on the confined spot.

While in the foregoing description and examples color is the most obvious property to use for comparing confined spot tests for quantitative determination, any measurable property of the deposits on the confined spot may be used as a means for comparison. For example, fluorescence, radioactivity or weight may be made the means of measurement or comparison. In addition, the confined spot may be used as a means of collecting as a precipitated compound the ion to be measured, after which the material may be removed from the spot prior to determining the ion by other means. From the foregoing it will be obvious that a new apparatus and method useful in quantitatively analyzing small volumes of solution has been described.

Since many widely differing embodiments of the invention will occur to one skilled in the art, modifications and changes may be made therein without departing from the spirit or scope thereof.

What is claimed is:

In a device for making quantitative estimations using the spot test method including means for confining a predetermined area of a permeable test strip in contact with a fluid sample, the improvement which comprises the combination therewith of a transparent duct depending from said confining means adapted to receive and discharge spent sample fluid, and to receive and discharge hydrostatic liquid, calibration marks on said duct providing visual indication of the rate at which hydrostatic liquid falls in said duct, a calibrated capillary tube communicating with the lower end of said duct adapted by capillary attraction and restriction to control the discharge rate of hydrostatic fluid from said duct, means including an inlet tube also communicating with the lower end of said duct adapted to fill and empty said duct with hydrostatic fluid, and a three-way valve interposed between said duct, inlet tube and capillary tube at the junctures thereof, adapted to provide in one position of said valve a passage between said duct and said capillary, and in another position a passage between said inlet tube and said duct.

ROLLIN E. STEVENS.
HUBERT W. LAKIN.
JOSEPH F. MULLINS.

References Cited in the file of this patent

UNITED STATES PATENTS

| Number | Name | Date |
|---|---|---|
| 1,489,039 | Mack | Apr. 1, 1924 |
| 2,113,063 | Stryker | Apr. 5, 1938 |

OTHER REFERENCES

Yagoda, Confined Spot Test Papers, Carl Schleicher and Schull Co., New York, New York, Bull. No. 1, July 9, 1942, pages 2–5.